United States Patent
Ito et al.

(10) Patent No.: US 11,816,285 B2
(45) Date of Patent: Nov. 14, 2023

(54) DEVICES AND METHODS FOR ENHANCING PROXIMITY SENSING PERFORMANCE IN INPUT-DISPLAY DEVICES

(71) Applicant: Synaptics Incorporated, San Jose, CA (US)

(72) Inventors: Daisuke Ito, Tokyo (JP); Nobukazu Tanaka, Tokyo (JP); Masaaki Shiomura, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/707,692

(22) Filed: Mar. 29, 2022

(65) Prior Publication Data

US 2023/0315227 A1    Oct. 5, 2023

(51) Int. Cl.
*G06F 3/041*    (2006.01)
*G09G 5/10*    (2006.01)

(52) U.S. Cl.
CPC ......... *G06F 3/04166* (2019.05); *G09G 5/10* (2013.01); *G06F 2203/04101* (2013.01); *G09G 2310/027* (2013.01)

(58) Field of Classification Search
CPC ...... G06F 3/04166; G06F 2203/04101; G09G 5/10; G09G 2310/027
See application file for complete search history.

(56) References Cited

U.S. PATENT DOCUMENTS

| | | | |
|---|---|---|---|
| 7,920,773 B2 * | 4/2011 | Oshikiri ............... | G11B 27/105 345/82 |
| 2017/0108991 A1 * | 4/2017 | Noh ...................... | G06F 3/0446 |
| 2017/0193948 A1 * | 7/2017 | Sun ....................... | G09G 3/3677 |
| 2018/0095583 A1 * | 4/2018 | Kim ...................... | G06F 3/0412 |

* cited by examiner

*Primary Examiner* — Rodney Amadiz
(74) *Attorney, Agent, or Firm* — Leydig, Voit & Mayer, Ltd.

(57) ABSTRACT

An input-display device includes a display panel, sensor electrodes, and a display driver. The display panel includes source lines. The sensor electrodes are capacitively coupled to the source lines. The display driver is configured to receive image data. The display driver is further configured to process the image data in response to a detection of a horizontal stripe pattern in an image corresponding to the image data. The display driver is further configured to drive the source lines based at least in part on the processed image data.

20 Claims, 11 Drawing Sheets

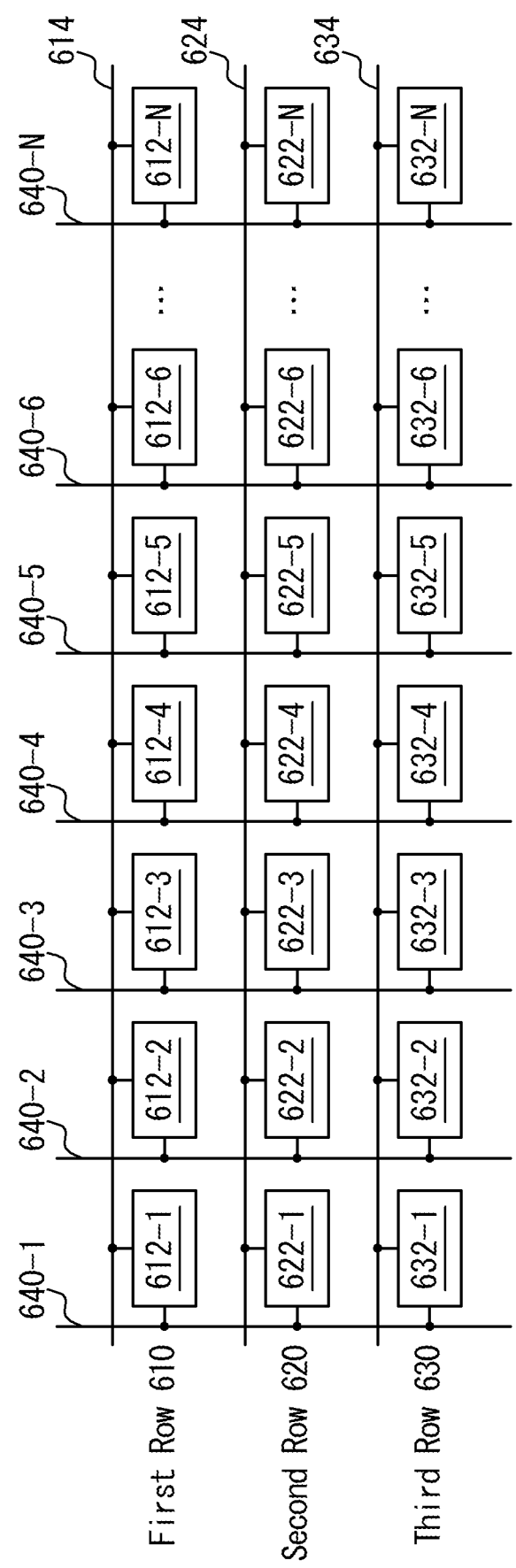

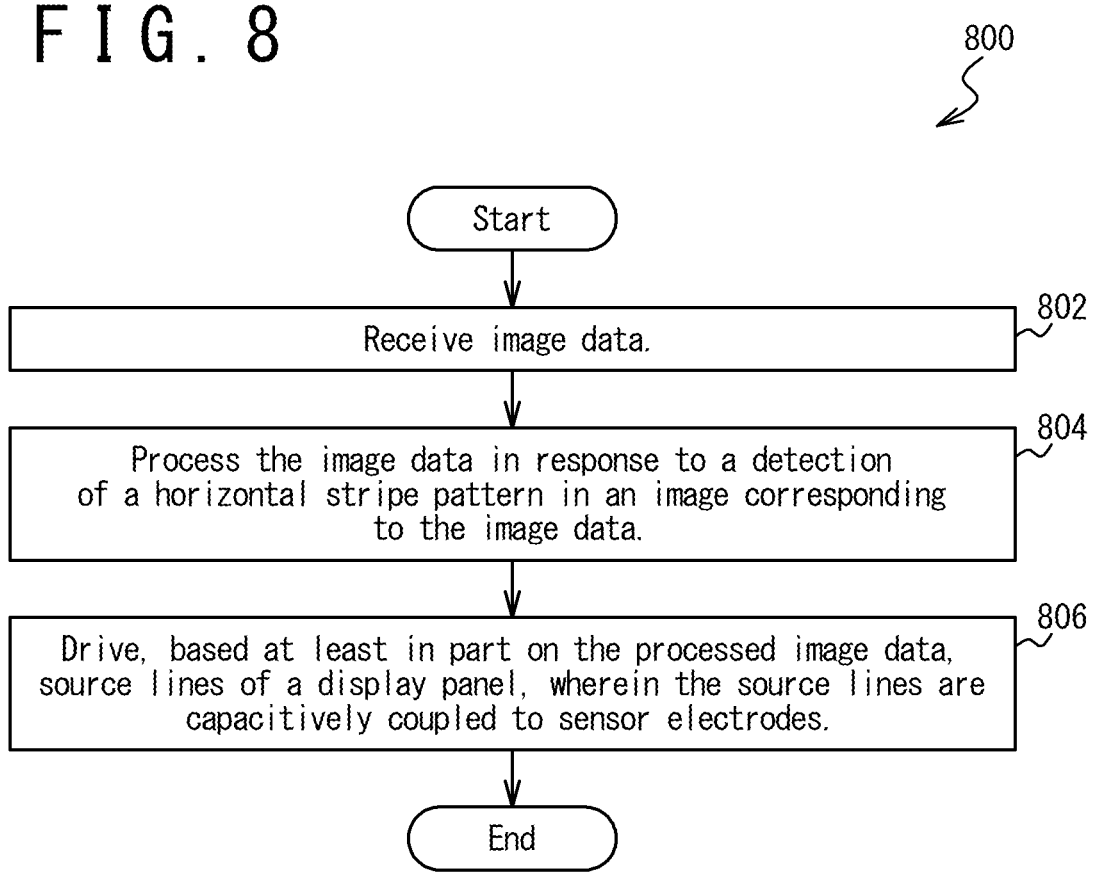

DEVICES AND METHODS FOR ENHANCING PROXIMITY SENSING PERFORMANCE IN INPUT-DISPLAY DEVICES

FIELD

The disclosed technology generally relates to devices and methods for enhancing proximity sensing performance in input-display devices.

BACKGROUND

Input-display devices adapted to both image displaying and proximity sensing are widely used as user-interfaces of electronic systems. An input-display device may include a display panel and an array of sensor electrodes disposed neighboring or integrated in the display panel. The input-display device may be configured to display an image on the display panel while sensing one or more input objects located on or near the display panel based on resulting signals received from the sensor electrodes. The resulting signals may experience electromagnetic interference emitted from the display panel, which may deteriorate the proximity sensing performance.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, an input-display device is provided. The input-display device includes a display panel, sensor electrodes, and a display driver. The display panel includes source lines. The sensor electrodes are capacitively coupled to the source lines. The display driver is configured to receive image data, process the image data in response to a detection of a horizontal stripe pattern in an image corresponding to the image data, and drive the source lines based at least in part on the processed image data.

In one or more embodiments, a display driver is provided. The display driver includes an image processing circuit and a source driver. The image processing circuit is configured to receive image data and process the image data in response to a detection of a horizontal stripe pattern in an image corresponding to the image data. The source driver is configured to drive source lines of a display panel based at least in part on the processed image data. The source lines are capacitively coupled to sensing electrodes.

In one or more embodiments, a method for driving a display panel is provided. The method includes receiving image data and processing the image data in response to a detection of a horizontal stripe pattern in an image corresponding to the image data. The method further includes driving, based at least in part on the processed image data, source lines of a display panel. The source lines are capacitively coupled to sensor electrodes.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 6B shows an example arrangement of display elements related to detection of a horizontal stripe pattern, according to one or more embodiments.

FIG. 8 shows example steps for driving a display panel, according to one or more embodiments.

Figure 1A:
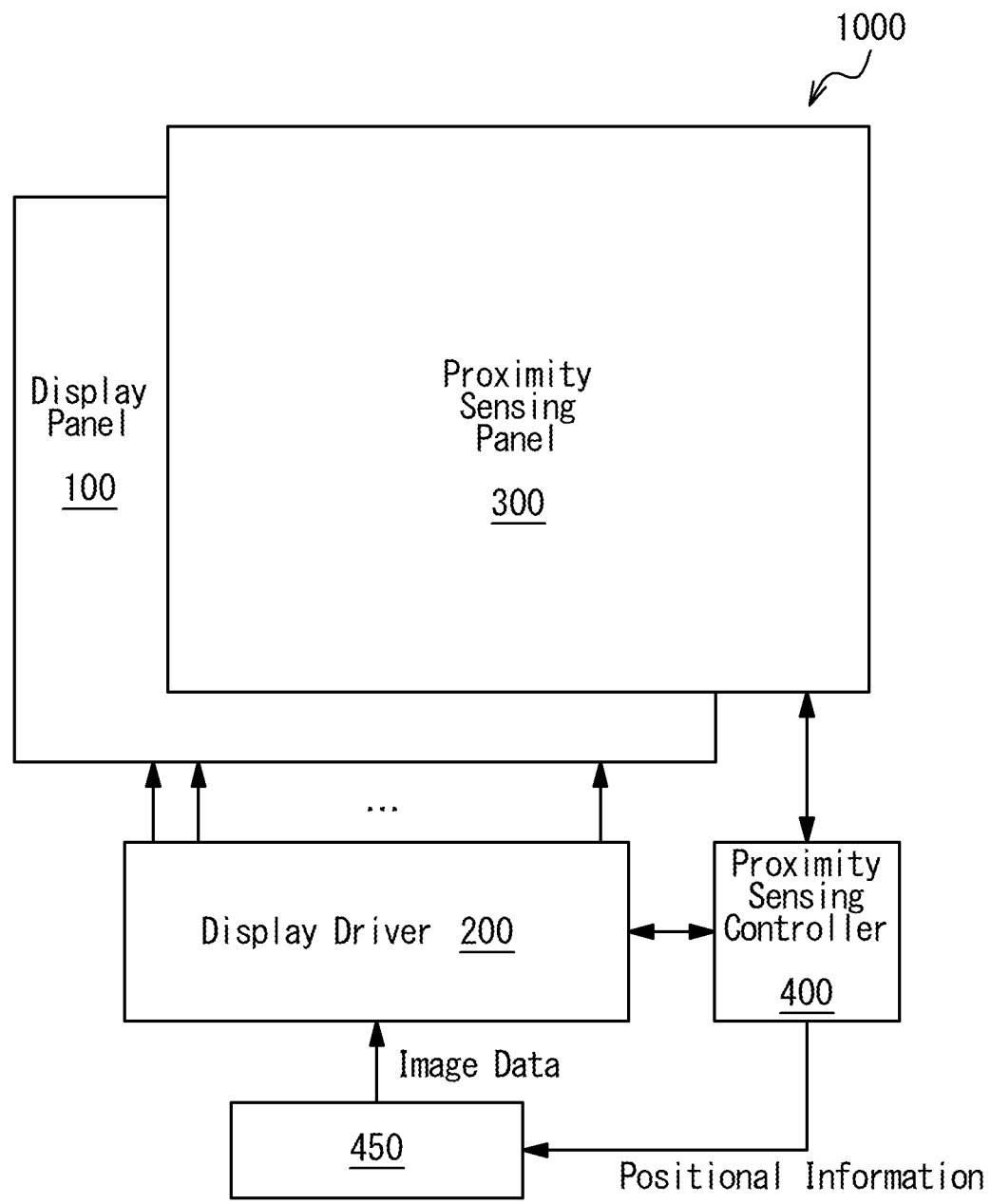
FIG. 1A shows an example configuration of an input-display device, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Input-display devices adapted to both image displaying and proximity sensing are often used as user-interfaces of electronic systems. The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include automotive user interfaces configured to give drivers user interface capabilities. An input-display device may include a display panel and an array of sensor electrodes disposed neighboring or integrated in the display panel. The input-display device may be configured to display an image on the display panel while sensing one or more input objects located on or near the display panel based on resulting signals received from the sensor electrodes.

In various implementations, a display panel includes gate lines (also referred to as scan lines) and source lines (also referred to as data lines). In accordance with the common terminology in the art, the direction in which is the gate lines are extended may be referred to as "horizontal" direction and the direction in which is the source lines are extended may be referred to as "vertical" direction. The source lines may be configured to provide data voltages to display elements (e.g., pixel circuits) of the display panel to update (or program) the display elements with the data voltages. The gate lines are used to select rows of display elements to be updated with the data voltages.

As the source lines of the display panel may extend to almost traverse the display panel in the vertical direction, the source lines may have considerable capacitances, causing capacitive coupling between the source lines and sensor electrodes disposed neighboring or integrated in the display panel. The capacitive coupling between the source lines and the sensor electrodes may cause electromagnetic interference onto the sensor electrodes during update of the display elements. The electromagnetic interference may have negative impact on the proximity sensing performance since the electromagnetic interference onto the sensor electrodes may generate noise in the resulting signals acquired from the sensor electrodes. Accordingly, there is a technical need for mitigating the negative impact on the proximity sensing performance potentially caused by the capacitive coupling between the source lines and the sensor electrodes.

The electromagnetic interference emitted from the source lines depend on the image displayed on the display panel because the data voltages are generated on the source lines depending on the displayed image during update of the display elements. The present disclosure recognizes that one severe situation is that the displayed image at least partially includes a horizontal stripe pattern. The horizontal stripe pattern referred herein may include one or more bright stripes and one or more dark stripes extending in the "horizontal" direction (i.e., the direction in which the gate lines are extended) which are alternately arranged in the "vertical" direction (i.e., the direction in which the source lines are extended). The horizontal stripe pattern in the displayed image may generates large change in the voltage levels on the source lines, undesirably increasing electromagnetic interference onto the sensor electrodes due to the capacitive coupling between the source lines and the sensor electrodes.

The present disclosure offers various techniques for mitigating deterioration of the proximity sensing performance potentially caused by electromagnetic interference onto the sensor electrodes due to the capacitive coupling between the source lines and the sensor electrodes. In one or more embodiments, an input-display device includes a display panel, sensor electrodes, and a display driver. The display panel includes source lines. The sensor electrodes are capacitively coupled to the source lines. The display driver is configured to receive image data, process the image data in response to a detection of a horizontal stripe pattern in an image corresponding to the image data, and drive the source lines based at least in part on the processed image data.

The processing of the image data may be performed to reduce changes in the voltage level on the source lines while reducing an impact on the image actually perceived by human eyes. Some implementations may utilize the fact that a horizontal stripe pattern is actually perceived by human eyes as a uniform image with averaged luminance in embodiments where the display panel has a sufficiently high pixel density, for example, 326 pixel per inch (ppi) or higher. In such implementations, the processing of the image data may include luminance averaging. The luminance averaging may include generating the processed image data to make luminance uniform over at least part of the image, the part corresponding to the horizontal stripe pattern. In the following, a description is given of detailed embodiments of the present disclosure.

Figure 1B:
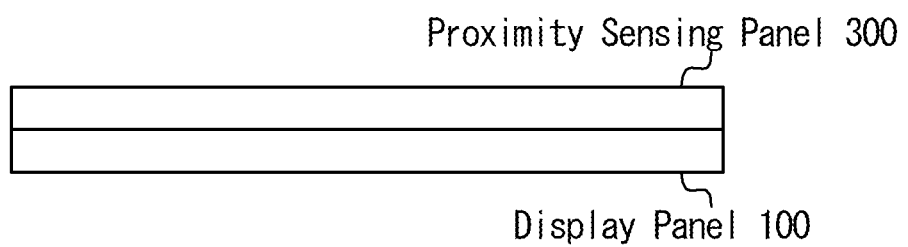
FIG. 1B shows an example side view of the input-display device, according to one or more embodiments.

FIG. 1A shows an example configuration of an input-display device 1000, according to one or more embodiments. The input-display device 1000 may be configured to provide a user interface for a user to interact with an electronic system (not shown). In the shown embodiment, the input-display device 1000 includes a display panel 100, a display driver 200, a proximity sensing panel 300, and a proximity sensing controller 400. The display panel 100 is coupled to the display driver 200, and the proximity sensing panel 300 is coupled to the proximity sensing controller 400. The display driver 200 and the proximity sensing controller 400 are further coupled to a host 450. Examples of the host 450 include an application processor, a central processing unit (CPU), a special purpose processor, and other types of processors. As shown in FIG. 1B, the proximity sensing panel 300 is disposed on or near the display panel 100, at least partially overlapping the display panel 100.

Figure 2:
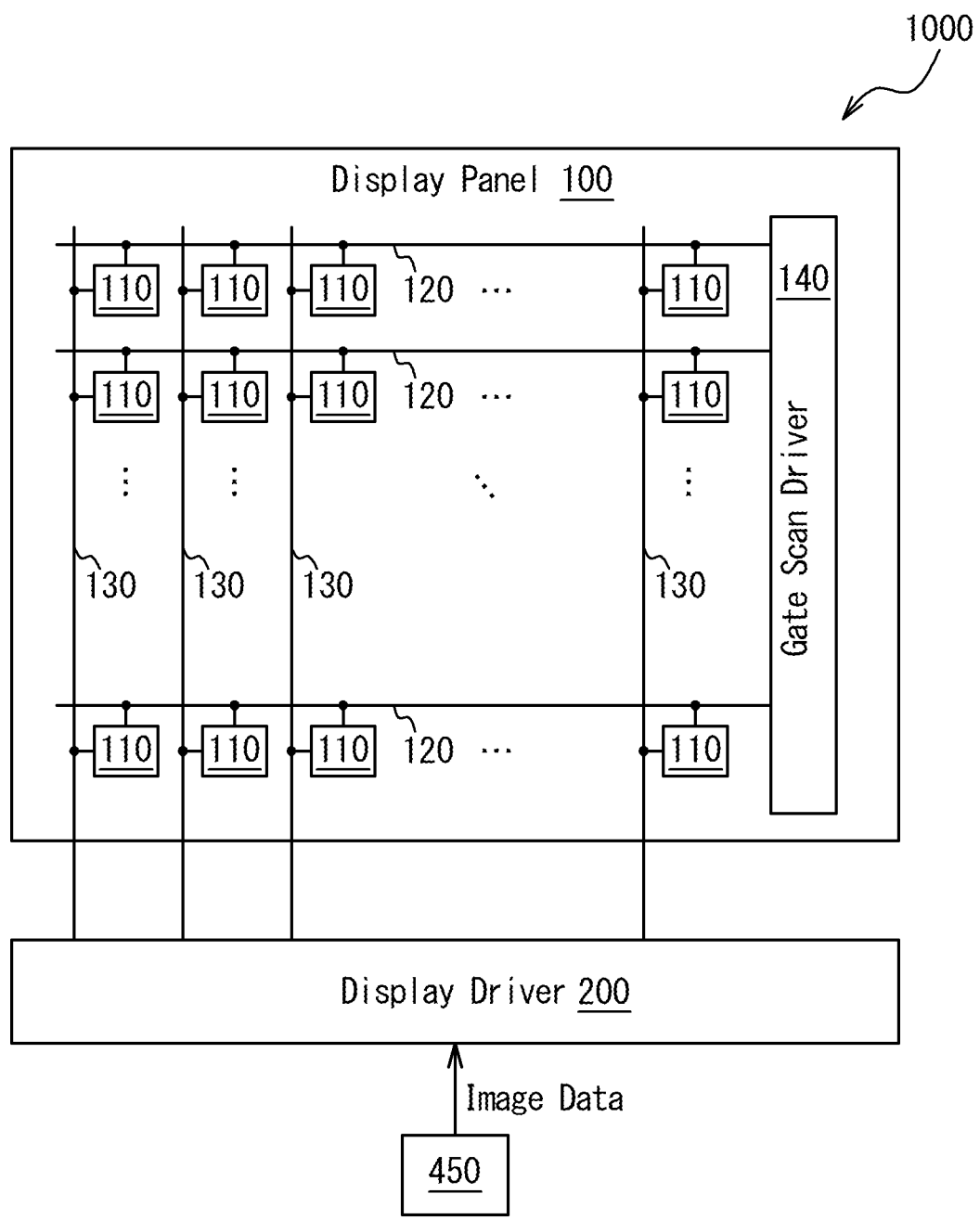
FIG. 2 shows an example configuration of a display panel, according to one or more embodiments.

FIG. 2 shows an example configuration of the display panel 100, according to one or more embodiments. The display panel 100 may be any type of dynamic display capable of displaying a visual interface to a user. Examples of the display panel 100 include organic light emitting diode (OLED) display panels, micro light emitting diode (LED) display panels and liquid crystal display (LCD) panels. In the shown embodiment, the display panel 100 includes display elements 110, gate lines 120 (also referred to as scan lines), source lines 130 (also referred to as data lines), and a gate scan driver 140. Each display element 110 may include an OLED pixel, a micro LED pixel, an LCD pixel, or a different type of pixel. Each display element 110 is coupled to the corresponding gate line 120 and source line 130. It is noted that the source lines 130 each have a significant capacitance since the source lines 130 almost traverse the display panel 100 in the vertical direction.

Each display element 110 of the display panel 100 is configured to be updated or programmed with a data voltage generated on the corresponding source line 130 when the gate line 120 coupled to the display element 110 is asserted. The gate scan driver 140 is configured to scan the gate lines 120 to select a row of display elements 110 to be updated. When display elements 110 of a selected row is to be updated, the gate scan driver 140 asserts the gate line 120 coupled to the display elements 110 of the selected row.

The display panel 100 may further include other components and signal lines depending on the display technology. In embodiments where an OLED display panel is used as the display panel 100, for example, the display panel 100 may further include emission lines that control light emission of the display elements 110 and power lines that delivers a power supply voltage to the respective display elements 110.

The display driver 200 is configured to drive the source lines 130 of the display panel 100 based on image data received from the host 450. The image data corresponds to an image to be displayed on the display panel 100. The image data may include graylevels of the respective display elements 110 of the display panel 100. The display driver 200 is configured to generate data voltages for the respective display elements 110 based on the image data received from the host 450 and provide the generated data voltages to the respective display elements 110 via the source lines 130.

Figure 3:
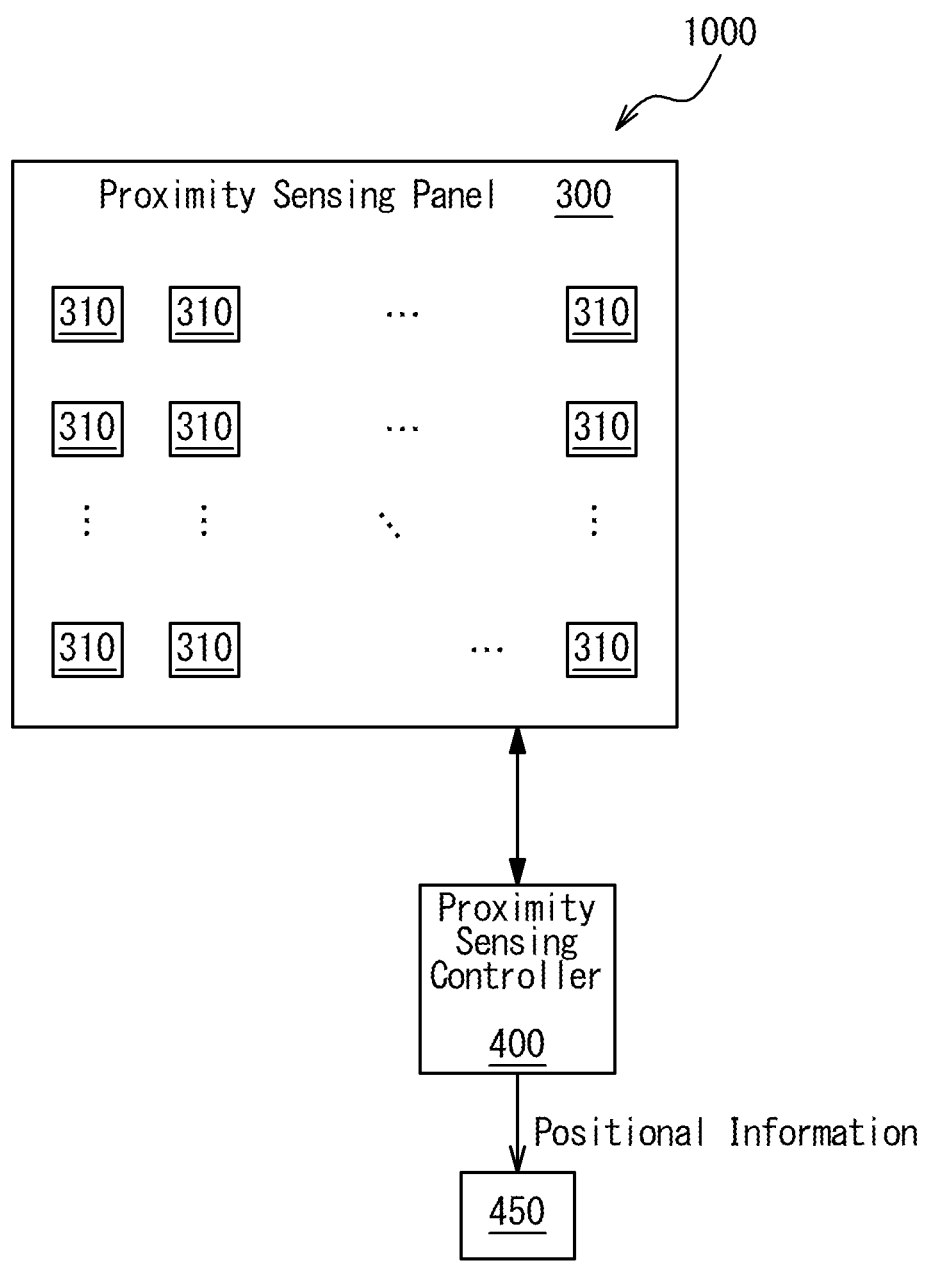
FIG. 3 shows an example configuration of a proximity sensing panel, according to one or more embodiments.

FIG. 3 shows an example configuration of the proximity sensing panel 300, according to one or more embodiments. In the shown embodiment, the proximity sensing panel 300 includes an array of sensor electrodes 310 disposed over the display panel 100. The sensor electrodes 310 are used for proximity sensing to detect one or more input objects located on or near the proximity sensing panel 300. As used herein, proximity sensing includes touch sensing (e.g., contact on the proximity sensing panel 300 and/or the display panel 100). Examples of input objects include user's fingers and styli. While nine sensor electrodes 310 are shown in FIG. 3, those skilled in the art would appreciate the proximity sensing panel 300 may include more or less than nine sensor electrodes 310. Further, while FIG. 3 shows the sensor electrodes 310 are rectangular, the sensor electrodes 310 may be shaped in a different shape, such as triangular, square, rhombic, hexagonal, or other polygonal shapes.

The proximity sensing controller 400 is configured to sense one or more input objects based on resulting signals received from the sensor electrodes 310 and generate positional information of the one or more sensed input objects. "Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time. The generated positional information is sent to the host 450.

In one or more embodiments, the proximity sensing controller 400 is configured to sense one or more input objects through capacitive proximity sensing. Some capacitive proximity sensing implementations utilize "absolute capacitance" (also often referred to as "self-capacitance") sensing methods based on changes in the capacitive coupling between the sensor electrodes 310 and an input object. In various embodiments, an input object near the sensor electrodes 310 alters the electric field near the sensor electrodes 310, thus changing the capacitive coupling. The resulting signals acquired from the sensor electrodes 310 include effects of the changes in the capacitive coupling. In one implementation, an absolute capacitance sensing method operates by modulating the sensor electrodes 310 with respect to a reference voltage, e.g., system ground, and by detecting the capacitive coupling between the sensor electrodes 310 and input objects.

Some capacitive proximity sensing implementations utilize "transcapacitance" (also often referred to as "mutual capacitance") sensing methods based on changes in the capacitive coupling between transmitter electrodes (not shown) and the sensor electrodes 310. In various embodiments, an input object near the sensor electrodes 310 alters the electric field between the transmitter electrodes and the sensor electrodes 310, thus changing the capacitive coupling. In one implementation, a transcapacitance sensing method operates by detecting the capacitive coupling between one or more transmitter electrodes and one or more sensor electrodes 310. The coupling may be reduced when an input object coupled to a system ground approaches the sensor electrodes 310. Transmitter electrodes may be modulated relative to a reference voltage, e.g., system ground. The sensor electrodes 310 may be held substantially constant relative to the reference voltage or modulated relative to the transmitter electrodes to facilitate receipt of resulting signals.

Figure 4:
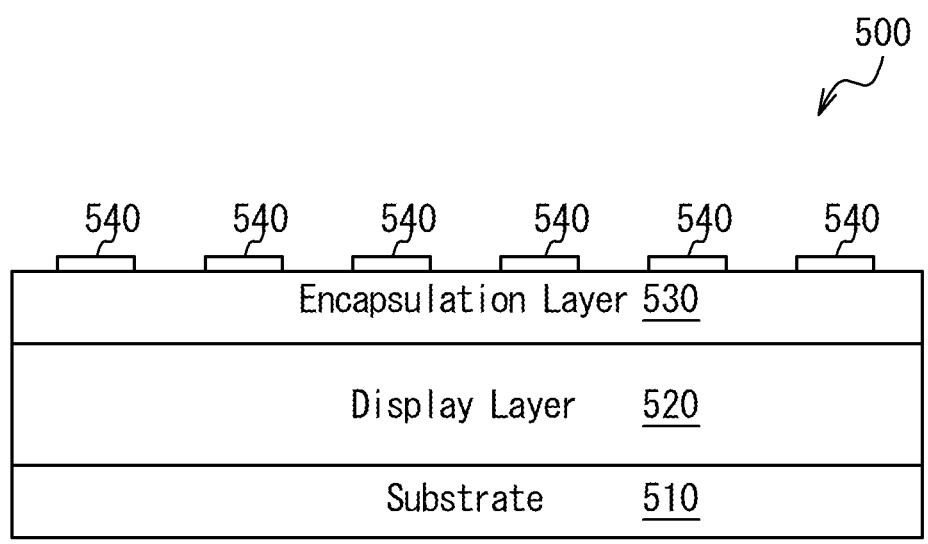
FIG. 4 shows an example configuration of a display panel that incorporates sensor electrodes, according to one or more embodiments.

In some embodiments, sensor electrodes for proximity sensing may be integrated in a display panel. FIG. 4 shows an example configuration of a display panel 500 that incorporates sensor electrodes 540, according to one or more embodiments. A proximity sensing controller (e.g., the proximity sensing controller 400 shown in FIGS. 1A and 3) may be configured to sense one or more input objects based on resulting signals received from the sensor electrodes 540.

In the illustrated embodiment, the display panel 500 includes a substrate 510, a display layer 520, and an encapsulation layer 530 in series. In one embodiment, the substrate 510 is a flexible plastic substrate, to enable a flexible, rollable and/or foldable display panel. The display layer 520 may incorporate therein components and signal lines used for image displaying, such as the display elements 110, the gate lines 120, the source lines 130, and the gate scan driver 140 shown in FIG. 2. The encapsulation layer 530 is formed to cover the display layer 520 to protect the components and signal lines disposed in the display layer 520. In the shown embodiment, the sensor electrodes 540 are disposed on the encapsulation layer 530. In embodiments where the display panel 500 is configured to be a flexible, rollable and/or foldable, the thickness of the encapsulation layer 530 may be reduced to enhance the flexibility of the display panel 500.

In some implementations, sensor electrodes may be capacitively coupled to source lines of the display panel. For the embodiment shown in FIGS. 1A to 3, for example, the sensor electrodes 310 of the proximity sensing panel 300 may be capacitively coupled to the source lines 130 of the display panel 100. For the embodiment shown in FIG. 4, the sensor electrodes 540 may be capacitively coupled to the source lines disposed in the display layer 520. The capacitive coupling between the sensor electrodes and the source lines is more enhanced as the distance decreases between the sensor electrodes and the source lines. For example, in embodiments where the display panel 500 of FIG. 4 is configured to be a flexible, rollable and/or foldable, the distance between the sensor electrodes 540 and the source lines in the display layer 520 may be reduced since the thickness of the encapsulation layer 530 may be reduced to enhance the flexibility of the display panel 500.

The capacitive coupling between the source lines and the sensor electrodes may deteriorate the proximity sensing performance because the capacitive coupling may generate noise in the resulting signals acquired from the sensor electrodes due to electromagnetic interference onto the sensor electrodes during update of the display elements. The deterioration in the proximity sensing performance may be more severe in embodiments where the distance between the source lines and the sensor electrodes is reduced (as in the embodiment shown in FIG. 4). The electromagnetic interference caused by the capacitive coupling between the source lines and the sensor electrodes depend on the image displayed on the display panel, since the data voltages generated on the source lines depend on the displayed image during update of the display elements.

As discussed above, one severe situation is that the displayed image at least partially includes a "horizontal stripe pattern." In some implementations, the horizontal stripe pattern may include a first row of display elements, a second row of display elements, and a third row of display elements, the first row, the second row, and the third row being arrayed in series. A "row" of display elements referred herein are display elements coupled to the same gate line (e.g., the gate line 120 in FIG. 2). The image data may specify a first graylevel for the first and third rows of the display elements while specifying a second graylevel different from the first graylevel. One of the first graylevel and the second graylevel may be the maximum graylevel (typically, 255), and the other of the first graylevel and the second graylevel may be the minimum graylevel (typically, 0).

Figure 5A:
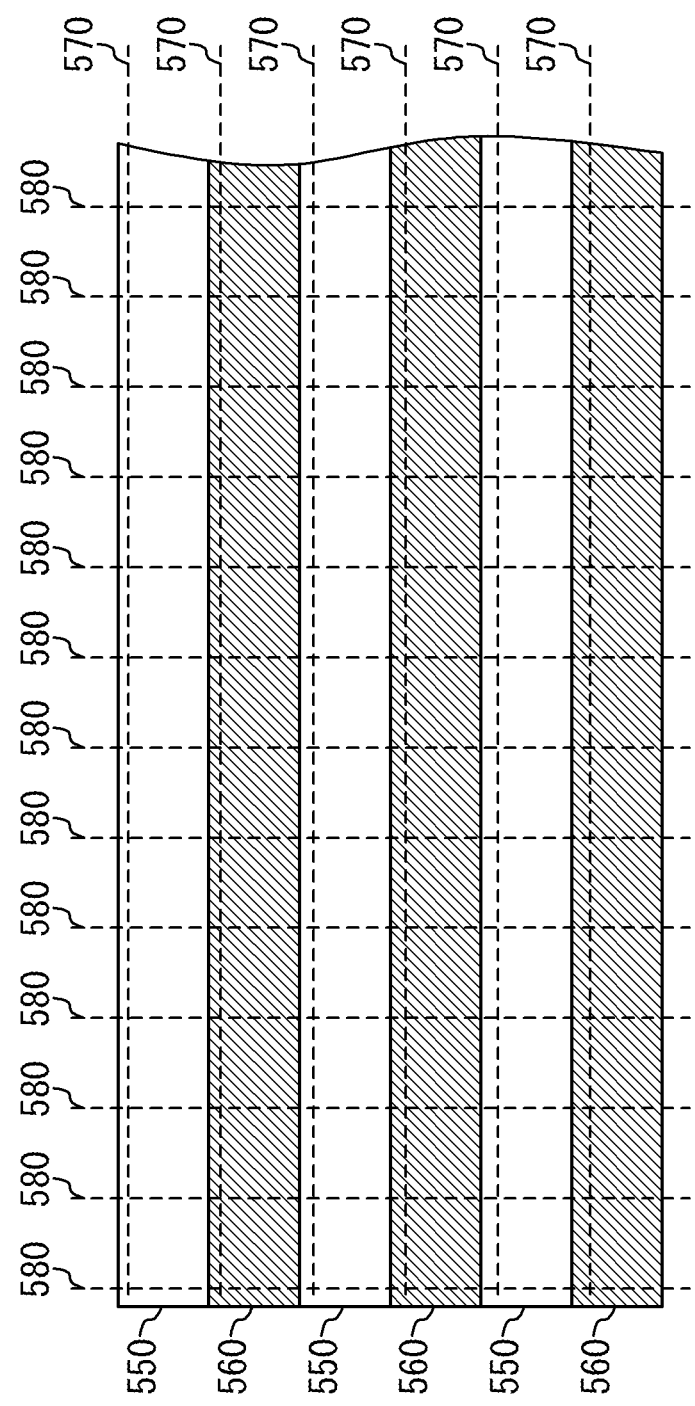
FIG. 5A shows an example "horizontal stripe pattern" in a display image, according to one or more embodiments.

FIG. 5A shows an example "horizontal stripe pattern" in the display image, according to one or more embodiments. In the shown embodiment, the horizontal stripe pattern includes bright stripes 550 and dark stripes 560 which both extend in the horizontal direction. The bright stripes 550 and the dark stripes 560 are alternately arranged in the vertical direction. In FIG. 5A, relevant gate lines 570 and source lines 580 are also shown in phantom while display elements coupled to the gate lines 570 and source lines 580 are not shown for simplicity. In the shown embodiment, each bright stripe 550 corresponds to a row of display elements for which a first graylevel is specified while each dark stripe 560 corresponds to a row of display elements for which a second graylevel lower than the first graylevel is specified. A "row" of display elements referred herein are display elements coupled to the same gate line 570. In some embodiments, the first graylevel may be the maximum graylevel (typically, 255) and the second graylevel may be the minimum graylevel, (typically 0). In one implementation, the first graylevel and the second graylevel may be defined by settings stored in the display driver (e.g., the display driver 200 of FIGS. 1A and 2). In embodiments where each bright stripe 550 corresponds to a row of display elements with the maximum graylevel (typically, 255) and each dark stripe 560 corresponds to a row of display elements with the minimum graylevel is specified (typically 0), possible largest changes occur in the data voltages generated on the source lines 580.

In other embodiments, each bright stripe 550 corresponds to a row of display elements for which graylevels in a first graylevel range is specified while each dark stripe 560 corresponds to a row of display elements for which graylevels in a second graylevel range is specified. The first graylevel range and the second graylevel range are defined such that the lower limit of the first graylevel range is higher than the upper limit of the second graylevel range. In some embodiments, the first graylevel range may include the maximum graylevel (typically, 255) while the second graylevel may include the minimum graylevel, (typically 0). In one implementation, the first graylevel range and the second graylevel range may be defined by settings stored in the display driver.

In one or more embodiments, each bright stripe 550 and each dark stripe 560 may correspond to two or more rows of display elements. In some implementations, each bright stripe 550 corresponds to two or more rows of display elements for which a first graylevel is specified while each dark stripe 560 corresponds to two or more rows of display elements for a second graylevel lower than the first graylevel is specified. The first graylevel may be the maximum graylevel (typically, 255) and the second graylevel may be the minimum graylevel, (typically 0). In other implementations, each bright stripe 550 corresponds to two or more rows of display elements for which graylevels in a first graylevel range is specified while each dark stripe 560 corresponds to two or more rows of display elements for which graylevels in a second graylevel range is specified. The first graylevel range and the second graylevel range are defined such that the lower limit of the first graylevel range is higher than the upper limit of the second graylevel range. The first graylevel range may include the maximum graylevel (typically, 255) while the second graylevel may include the minimum graylevel, (typically 0).

Figure 5B:
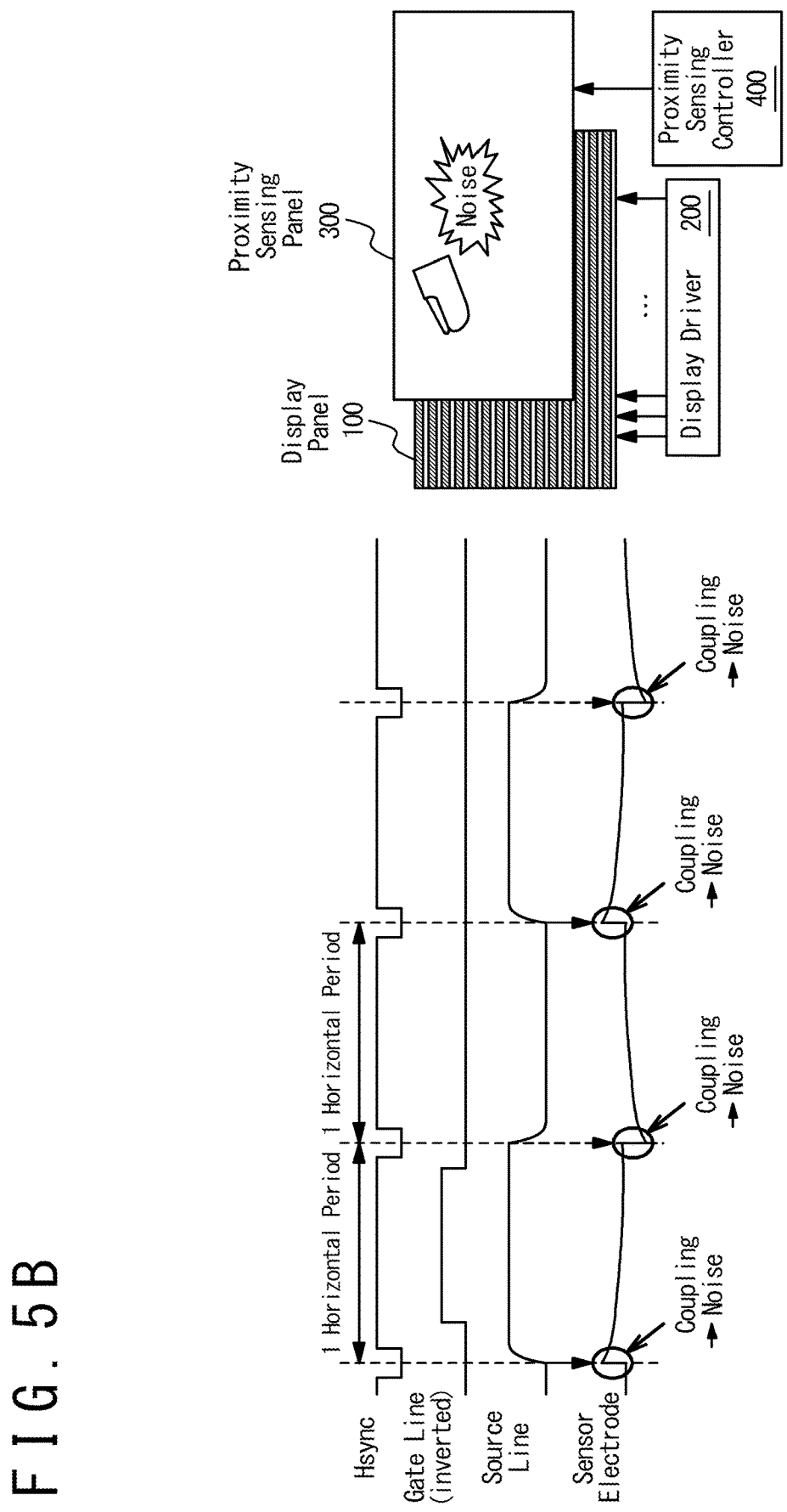
FIG. 5B shows example waveforms of data voltages generated on source lines and a voltage level on a sensor electrode.

FIG. 5B shows example waveforms of the data voltages generated on the source lines 130 (shown in FIG. 2) and the voltage level on a sensor electrode 310 (shown in FIG. 3) when the horizontal stripe pattern shown in FIG. 5A is displayed on the display panel 100. In the shown embodiment, the data voltages generated on the source lines largely changes between two discrete voltage levels at the beginning of each horizontal period. One of the two discrete voltage levels on the source lines 130 corresponds to the bright stripes 550 shown in FIG. 5A and the other corresponds to the dark stripes 560. Due to the capacitive coupling between the source lines 130 and the sensor electrode 310, the changes in the data voltages generated on the source lines 130 causes electromagnetic interference onto the sensor electrode 310, generating noise in the resulting signal acquired from the sensor electrode 310. The noise may deteriorate the proximity sensing performance.

In one or more embodiments, to mitigate electromagnetic interference onto sensor electrodes, the display driver is configured to process image data in response to a detection of a horizontal stripe pattern in the image corresponding to the image data. The processing of the image data is performed to reduce changes in the voltage level on the source lines with a reduced impact on the image actually perceived by human eyes. Some implementations may utilize the fact that a horizontal stripe pattern is actually perceived by human eyes as a uniform image with averaged luminance in embodiments where the display panel has a sufficiently high pixel density, for example, 326 pixel per inch (ppi) or higher. In such implementations, the display driver may apply luminance averaging to the image data to generate the processed image data used to drive the display elements. The luminance averaging may make luminance uniform over at least part of the displayed image, the part corresponding to the horizontal stripe pattern. The processed image data generated through the luminance averaging may specify the same graylevel for display elements relevant to the horizontal stripe pattern such that the luminance of the relevant display elements is equal to the averaged luminance of the horizontal stripe pattern. Updating the relevant display elements based on the processed image data effectively reduces changes in the data voltages on the source lines, mitigating electromagnetic interference on sensor electrodes. Further, the luminance averaging causes only a limited impact or no substantial impact on the displayed image in embodiments where the horizontal stripe pattern is actually perceived by human eyes as a uniform image.

Figure 6A:
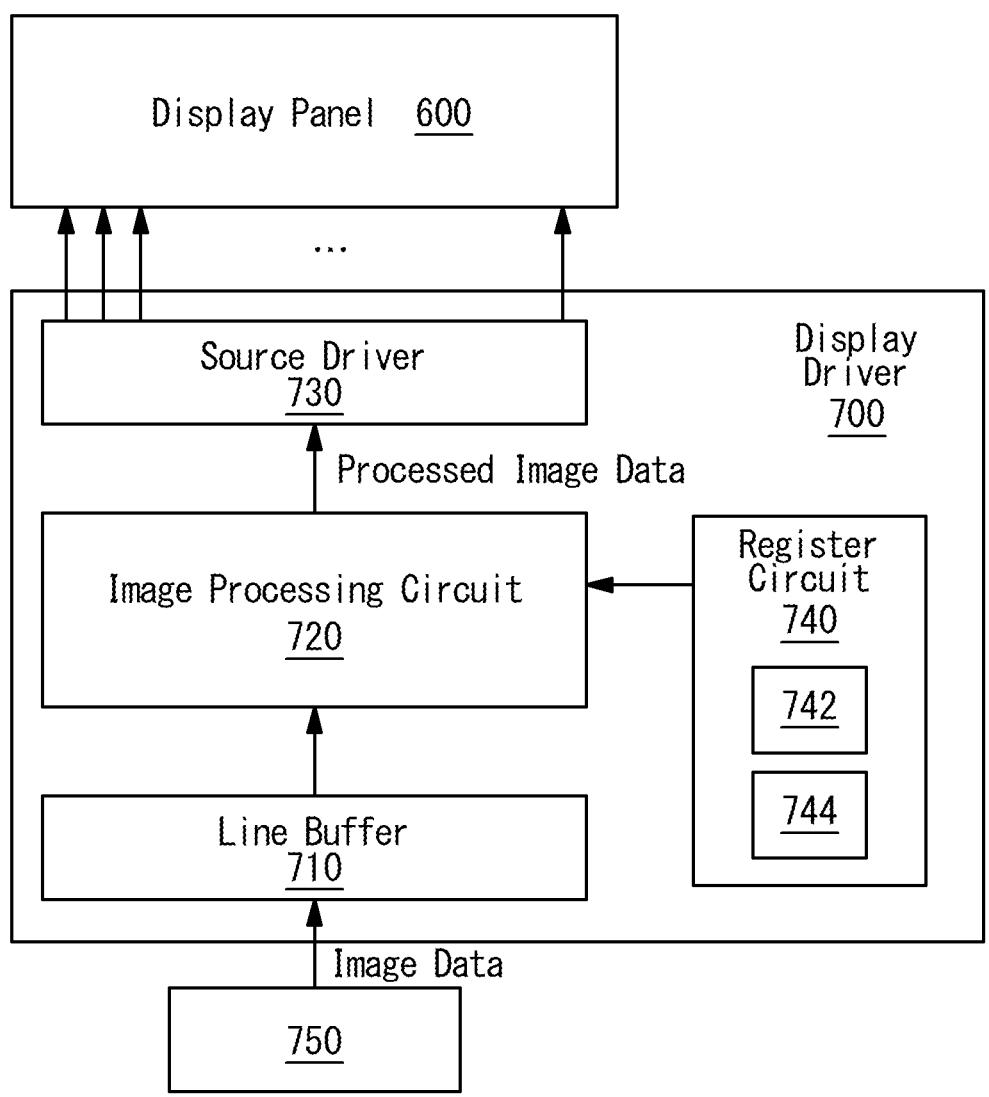
FIG. 6A show an example configuration of a display driver configured to mitigate electromagnetic interference onto sensor electrodes, according to one or more embodiments.

FIG. 6A shows an example configuration of a display driver 700 configured to mitigate electromagnetic interference onto sensor electrodes, according to one or more embodiments. The display driver 700 is configured to receive image data from a host 750 and update display elements of a display panel 600 based on the received image data. The display panel 600 may be one embodiment of the display panel 100 shown in FIGS. 1A and 2 or one embodiment of the display panel 500 shown in FIG. 4. The host 750 may be one embodiment of the host 450 shown in FIGS. 1A to 3. In the shown embodiment, the display driver 700 includes a line buffer 710, an image processing circuit 720, and a source driver 730.

The line buffer 710 is configured to receive the image data from the host 750 and temporarily store the received image data. The line buffer 710 may be configured to have a capacity enough to store image data for three or more consecutive (e.g., arranged in series) rows of display elements. It is noted that each row of the display elements is coupled to the same gate line. Image data for one row of display elements may be hereinafter referred to as "line image data". With this terminology, the line buffer 710 may be configured to store line image data for three or more rows of display elements. The line buffer 710 is further configured to forward the stored image data to the image processing circuit 720.

The image processing circuit 720 is configured to apply image processing to the image data received from the line buffer 710. The image processing performed by the image processing circuit 720 includes the above-discussed luminance averaging performed in response to detection of a horizontal stripe pattern. The image processing may further include, but not limited to, color adjustment, mura correction, image scaling, subpixel rendering, overshoot driving, gamma transformation, and other image processes. The image processing circuit 720 is further configured to provide the processed image data to the source driver 730. The source driver 730 is configured to drive source lines of the display panel 600 based on the processed image data received from the image processing circuit 720. In one implementation, the source driver 730 is configured to generate data voltages for display elements of the display panel 600 based on the processed image data and update the display elements with the generated data voltages via source lines.

The display driver 700 may further include a register circuit 740 configured to store settings that control the image processing performed by the image processing circuit 720. The stored settings may include a horizontal stripe pattern definition 742 that defines one or more horizontal stripe patterns to be detected. The image processing circuit 720 may use the horizontal stripe pattern definition 742 in detecting a horizontal stripe pattern. In embodiments where the horizontal stripe pattern shown in FIG. 5A is defined to be detected, for example, the stored settings may include the first graylevel for the bright stripes 550 and the second graylevel for the dark stripes 560. In other embodiments, the stored settings may include the first graylevel range for the bright stripes 550 and the second graylevel range for the dark stripes 560.

The stored settings stored in the register circuit 740 may further include a register value 744 that enables or disables luminance averaging in response to detection of a horizontal stripe pattern. A first value of the register value 744 may permit the image processing circuit 720 to perform the luminance averaging in response to detection of a horizontal stripe pattern. A second value of the register value 744 may prohibit the image processing circuit 720 from performing the luminance averaging even when a horizontal stripe pattern is detected.

In one or more embodiments, the image processing circuit 720 is configured to detect a horizontal stripe pattern based on the line image data for the three or more consecutive rows of display elements stored in the line buffer 710. In some embodiments, the detection of the horizontal stripe pattern may be based on the horizontal stripe pattern definition 742 stored in the register circuit 740, which defines one or more horizontal stripe patterns to be detected.

In some embodiments, the detection of a horizontal stripe pattern may be based on comparison between line image data of adjacent rows of display elements. FIG. 6B shows an example arrangement of display elements related to detection of a horizontal stripe pattern, according to one or more embodiments. In the shown embodiment, first line image data for a first row 610, second line image data for a second row 620, and third image data for a third row 630 are used for the detection of a horizontal stripe pattern. The first, second, and third rows 610, 620, and 630 are arrayed in series in the vertical direction. The first row 610 includes display elements 612-1 to 612-N commonly coupled to a gate line 614 and respectively coupled to source lines 640-1 to 640-N, where N is an integer of two or more. The first line image data for the first row 610 include graylevels of the display elements 612-1 to 612-N. The second row 620 includes display elements 622-1 to 622-N commonly coupled to a gate line 624 and respectively coupled to the source lines 640-1 to 640-N. The second line image data for the second row 620 include graylevels of the display elements 622-1 to 622-N. The third row 630 includes display elements 632-1 to 632-N commonly coupled to a gate line 634 and respectively coupled to the source lines 640-1 to 640-N. The third line image data for the third row 630 include graylevels of the display elements 632-1 to 632-N. It is noted that display elements 612-$i$, 622-$i$, and 632-$i$ on the same column (that is, arrayed in the vertical direction) are coupled to the same source line 640-$i$, where $i$ is an integer between 1 and N, inclusive.

The detection of a horizontal stripe pattern may be based on first comparison between the first line image data for the first row 610 and the second line image data for the second row 620 and second comparison between the second line image data for the second row 620 and the third line image data for the third row 630. The first comparison may calculate differences between the graylevels of the display elements 612-1 to 612-N of the first line image data and the graylevels of the corresponding display elements 622-1 to 622-N of the second line image data. The term "corresponding display element" means to be coupled to the same source line.

In one implementation, the first comparison may calculate each difference between the graylevel of the display element 612-$i$ of the first row 610 and the graylevel of the display element 622-$i$ of the second row 620 for each $i$ between 1 and N, inclusive. The first comparison may further count the number of differences that exceed a predetermined threshold out of the calculated differences between the graylevels of the display elements 612-1 to 612-N and the graylevels of the corresponding display elements 622-1 to 622-N.

Correspondingly, the second comparison may calculate differences between the graylevels of the display elements 622-1 to 622-N of the second line image data and the graylevels of the corresponding display elements 632-1 to 632-N of the third line image data. In one implementation, the second comparison may calculate each difference between the graylevel of the display element 622-i of the second row 620 and the graylevel of the display element 632-i of the third row 630, for each i between 1 and N, inclusive. The second comparison may further count the number of differences that exceed the predetermined threshold out of the calculated differences between the graylevels of the display elements 622-1 to 622-N and the graylevels of the corresponding display elements 632-1 to 632-N.

In some embodiments, a horizontal stripe pattern is detected when the counted numbers of the differences that exceed the threshold value which are acquired through the first comparison and the second comparison are both more than or equal to a predetermined number. The predetermined threshold and the predetermined number used for the horizontal stripe pattern detection may be stored in the register circuit 740 as part of the horizontal stripe pattern definition 742.

In embodiments where a horizontal stripe pattern to be detected is defined to include bright and dark stripes each including two rows of display elements, the image processing circuit 720 may be configured to detect a horizontal stripe pattern based on the line image data for the five or more consecutive rows of display elements stored in the line buffer 710. The detection of a horizontal stripe pattern may be based on comparison between line image data of adjacent two of display elements.

The image processing circuit 720 is further configured to, in response to the detection of the horizontal stripe pattern, apply luminance averaging to the image data received from the line buffer 710 to generate processed image data. The processed image data generated through the luminance averaging may specify the same graylevel for display elements relevant to the horizontal stripe pattern such that the luminance of the relevant display elements is equal to the averaged luminance of the horizontal stripe pattern. Driving the display panel 600 based on the processed image data effectively mitigate electromagnetic interference onto the sensor electrodes since the processed image data suppresses changes in the data voltages generated on the source lines. Further, in embodiments where the display panel 600 has such a high pixel density (e.g., 326 ppi or higher) that the horizontal stripe pattern is perceived by human eyes as a uniform image with averaged luminance, the luminance averaging causes no substantial impact on the image perception by human eyes.

The luminance averaging may be based on a gamma value $\gamma$ defined for the input-display device, which includes the display panel 600 and the display driver 700. The gamma value $\gamma$ is a parameter that defines input-output characteristics of the input-display device, which is configured to take the image data as input and display as output an image corresponding to the image data on the display panel 600. In some embodiments, as described in relation to FIG. 5A, a horizontal stripe pattern may include bright stripes 550 and dark stripes 560 which both extend in the horizontal direction while being alternately arranged in the vertical direction. A first graylevel may be specified for the display elements of each bright stripe 550 while a second graylevel lower than the first graylevel may be specified for the display elements of each dark stripe 560. In such embodiments, the processed image data generated through the luminance averaging may commonly specify the graylevel determined as a $\gamma$-th root of an average of a $\gamma$-th power of the first graylevel and a $\gamma$-th power of the second graylevel for the display elements relevant to the horizontal stripe pattern. In one implementation, the graylevel acquired by the following expression (1) may be commonly specified for the display elements relevant to the horizontal stripe pattern:

$$D_{lum\_ave} = \sqrt[\gamma]{(D_1^\gamma + D_2^\gamma)/2}, \qquad (1)$$

where $D_1$ is the first graylevel specified for the display elements of the bright stripes 550; $D_2$ is the second graylevel specified for the display elements of the dark stripes 560; $D_{lum\_ave}$ is the graylevel determined by the luminance averaging, commonly defined for the display elements relevant to the horizontal stripe pattern; and $\gamma$ is the gamma value defined for the input-display device.

In some embodiments, execution of the luminance averaging by the image processing circuit 720 may be controlled by the register value 744 stored in the register circuit 740. The image processing circuit 720 may be configured to perform the luminance averaging in response to detection of a horizontal stripe pattern when the register value 744 is a first value. The image processing circuit 720 may be further configured not to perform the luminance averaging when the register value 744 is a second value.

Figure 7:
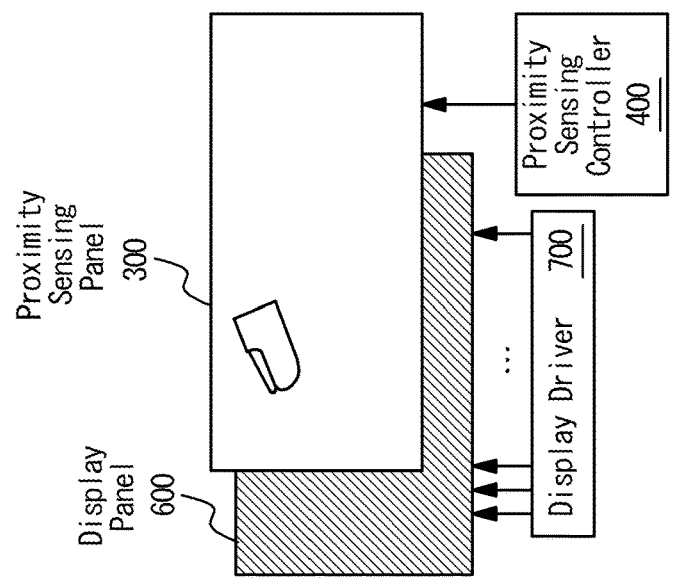
FIG. 7 shows example waveforms of data voltages generated on source lines and a voltage level on a sensor electrode, according to one or more embodiments.
Figure 7:
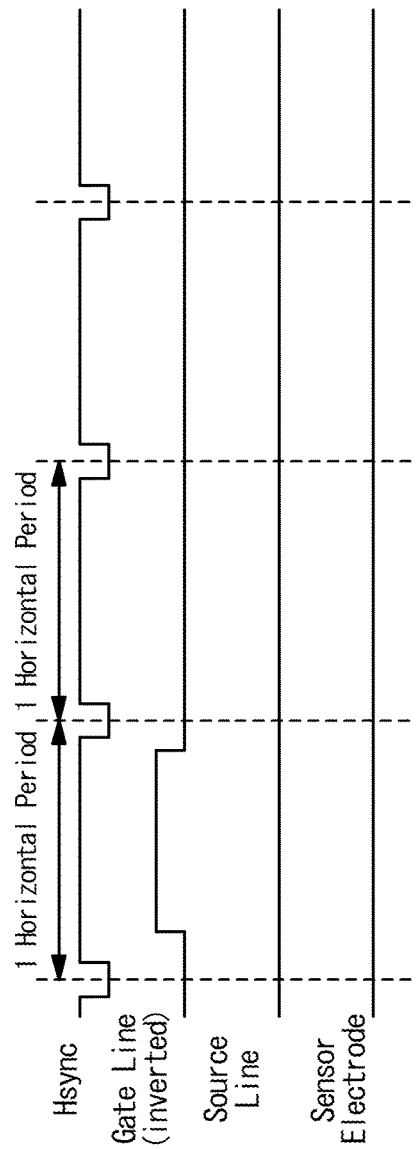

FIG. 7 shows example waveforms of the data voltages generated on the source lines of the display panel 600 and the voltage level on a sensor electrode neighboring or integrated in the display panel 600, according to one or more embodiments where luminance averaging is applied to the image data. In the shown embodiment, the data voltages generated on the source lines are kept constant due to the luminance averaging, reducing or eliminating electromagnetic interference onto the sensor electrode. The reduction of the electromagnetic interference may effectively improve the proximity sensing performance.

Method 800 of FIG. 8 shows example steps for driving a display panel (e.g., the display panel 100 of FIGS. 1A and 2 and the display panel 500 of FIG. 4), according to one or more embodiments. It is noted that one or more of the steps shown in FIG. 8 may be omitted, repeated, and/or performed in a different order. It is further noted that two or more steps may be implemented at the same time.

The method 800 includes receiving image data (e.g., from the host 450 of FIGS. 1A and 3 or the host 750 of FIG. 6A) at step 802. The method 800 further includes processing the image data in response to a detection of a horizontal stripe pattern (e.g., the horizontal stripe pattern shown in FIG. 5A) in an image corresponding to the image data at step 804. The processing of the image data may include luminance averaging as discussed above. The processing of the image data may reduce changes in the voltage level on the source lines while reducing an impact on the image actually perceived by human eyes. The luminance averaging may include generating the processed image data to make luminance uniform over at least part of the image, the part corresponding to the horizontal stripe pattern. The method 800 further includes driving, based at least in part on the processed image data, source lines of a display panel, wherein the source lines are capacitively coupled to sensor electrodes.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. An input-display device comprising:
a display panel comprising source lines;
sensor electrodes capacitively coupled to the source lines; and
a display driver configured to:
receive image data,
process the image data in response to a detection of a horizontal stripe pattern in an image corresponding to the image data, wherein the processed image data comprises an average luminance of the horizontal stripe pattern, and
drive the source lines based at least in part on the processed image data,
wherein the sensor electrodes are configured to detect the presence of an input object when the source lines are driven with the processed image data.

2. The input-display device of claim 1, wherein the horizontal stripe pattern comprises a plurality of horizontal stripes extending in an extending direction of gate lines of the display panel.

3. The input-display device of claim 1, wherein the horizontal stripe pattern comprises:
a first row of display elements for which the image data specifies a first graylevel;
a second row of display elements for which the image data specifies a second graylevel different from the first graylevel; and
a third row of display elements for which the image data specifies the first graylevel, and
wherein the first row, the second row, and the third row are arrayed in series.

4. The input-display device of claim 3, wherein one of the first graylevel and the second graylevel is a maximum graylevel, and the other of the first graylevel and the second graylevel is a minimum graylevel.

5. The input-display device of claim 1, wherein the image data comprises line image data for three or more rows of display elements of the display panel, and
wherein the detection of the horizontal stripe pattern is based at least in part on the line image data for the three or more rows of the display elements.

6. The input-display device of claim 1, wherein the image data comprises:
first line image data comprising graylevels of first display elements on a first row;
second line image data comprising graylevels of second display elements on a second row; and
third line image data comprising graylevels of third display elements on a third row, wherein the first row, the second row, and the third row are arrayed in series on the display panel, and
wherein the detection of the horizontal stripe pattern is based at least in part on:
first differences between the graylevels of the first display elements and the graylevels of the corresponding second display elements, and
second differences between the graylevels of the second display elements and the graylevels of the corresponding third display elements.

7. The input-display device of claim 1, wherein processing the image data comprises generating the processed image data to make luminance uniform over at least part of the image, the part corresponding to the horizontal stripe pattern.

8. The input-display device of claim 1, wherein the horizontal stripe pattern comprises:
a first row of display elements for which the image data specifies a first graylevel; and
a second row of display elements for which the image data specifies a second graylevel,
wherein processing the image data comprises generating the processed image data such that the processed image data specifies a third graylevel for the first row of display elements and the second row of display elements, and
wherein the third graylevel is determined as a $\gamma$-th root of an average of a $\gamma$-th power of the first graylevel and a $\gamma$-th power of the second graylevel, wherein y is a gamma value defined for the input-display device.

9. The input-display device of claim 1, further comprising a proximity sensing controller configured to generate positional information of an input object based at least in part on resulting signals acquired from the sensor electrodes.

10. A display driver, comprising:
an image processing circuit configured to:
receive image data, and
process the image data in response to a detection of a horizontal stripe pattern in an image corresponding to the image data, wherein the processed image data comprises an average luminance of the horizontal stripe pattern; and
a source driver configured to drive source lines of a display panel based at least in part on the processed image data, the source lines capacitively coupled to sensor electrodes, wherein the sensor electrodes are configured to detect the presence of an input object when the source lines are driven with the processed image data.

11. The display driver of claim 10, wherein the horizontal stripe pattern comprises a plurality of horizontal stripes extending in an extending direction of gate lines of the display panel.

12. The display driver of claim 10, wherein the horizontal stripe pattern comprises:
a first row of display elements for which the image data specifies a first graylevel;
a second row of display elements for which the image data specifies a second graylevel different from the first graylevel; and
a third row of display elements for which the image data specifies the first graylevel, and
wherein the first row, the second row, and the third row are arrayed in series.

13. The display driver of claim 12, wherein one of the first graylevel and the second graylevel is a maximum graylevel, and the other of the first graylevel and the second graylevel is a minimum graylevel.

14. The display driver of claim 10, wherein the image data comprises line image data for three or more rows of display elements of the display panel, and
wherein the detection of the horizontal stripe pattern is based at least in part on the line image data for the three or more rows of the display elements.

15. The display driver of claim 10, wherein the image data comprises:
first line image data comprising graylevels of first display elements on a first row;
second line image data comprising graylevels of second display elements on a second row; and
third line image data comprising graylevels of third display elements on a third row, wherein the first row, the second row, and the third row are arrayed in series on the display panel, and wherein the detection of the horizontal stripe pattern is based at least in part on:
first differences between the graylevels of the first display elements and the graylevels of the corresponding second display elements, and
second differences between the graylevels of the second display elements and the graylevels of the corresponding third display elements.

16. The display driver of claim 10, wherein processing the image data comprises generating the processed image data to make luminance uniform over at least part of the image, the part corresponding to the horizontal stripe pattern.

17. The display driver of claim 10, wherein the horizontal stripe pattern comprises:
a first row of display elements for which the image data specifies a first graylevel; and
a second row of display elements for which the image data specifies a second graylevel,
wherein processing the image data comprises generating the processed image data such that the processed image data specifies a third graylevel for the first row of display elements and the second row of display elements, and
wherein the third graylevel is determined as a γ-th root of an average of a γ-th power of the first graylevel and a γ-th power of the second graylevel, where γ is a gamma value defined for the display driver.

18. A method, comprising:
receiving image data,
processing the image data in response to a detection of a horizontal stripe pattern in an image corresponding to the image data, wherein the processed image data comprises an average luminance of the horizontal stripe pattern, and
driving, based at least in part on the processed image data, source lines of a display panel, wherein the source lines are capacitively coupled to sensor electrodes, wherein the sensor electrodes are configured to detect the presence of an input object when the source lines are driven with the processed image data.

19. The method of claim 18, wherein the image data comprises line image data for three or more rows of display elements of the display panel, and
wherein the detection of the horizontal stripe pattern is based at least in part on the line image data for the three or more rows of the display elements.

20. The method of claim 18, wherein processing the image data comprises generating the processed image data to make luminance uniform over at least part of the image, the part corresponding to the horizontal stripe pattern.

* * * * *